No. 655,477. Patented Aug. 7, 1900.
G. E. COMBS.
FEED TROUGH FOR HORSES.
(Application filed Jan. 23, 1900.)
(No Model.)
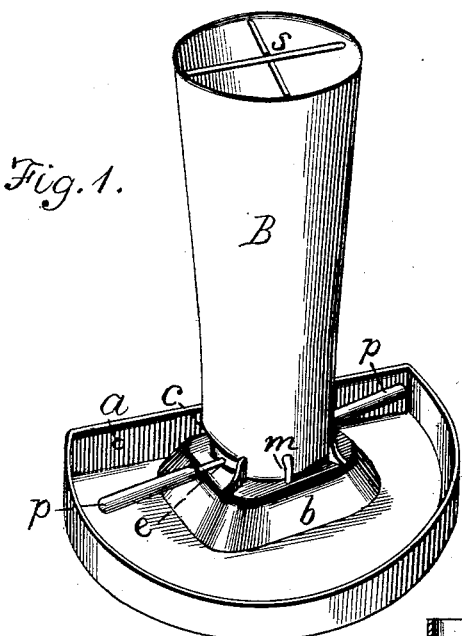
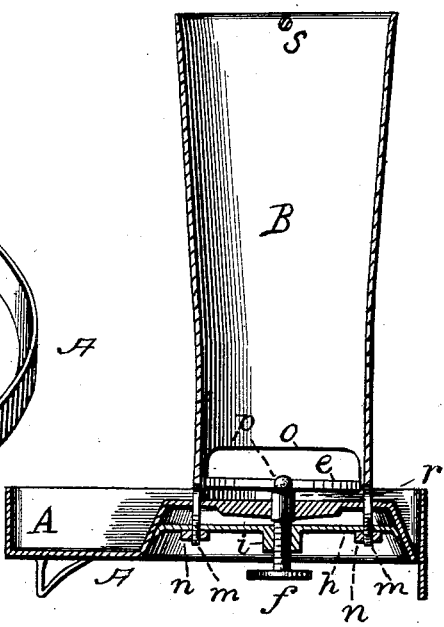
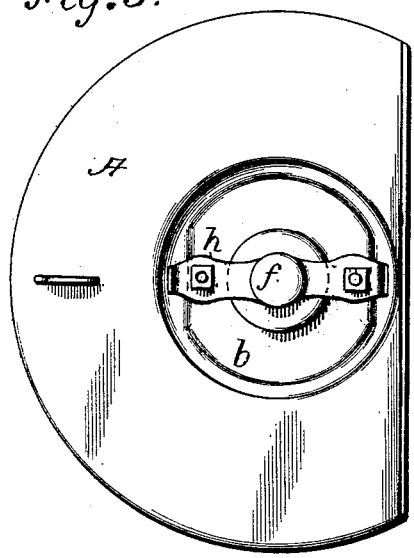
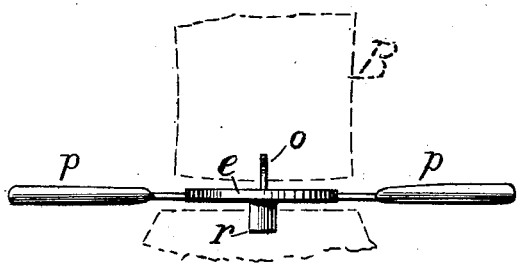
Witnesses:
Saml J. Wallace,
Arthur D. Kinne,
Inventor:
George E. Combs
By H. A. Daniels
Attorney
THE NORRIS PETERS CO., PHOTO-LITHO., WASHINGTON, D. C.

UNITED STATES PATENT OFFICE.

GEORGE E. COMBS, OF CHADWICKS, NEW YORK.

FEED-TROUGH FOR HORSES.

SPECIFICATION forming part of Letters Patent No. 655,477, dated August 7, 1900.

Application filed January 23, 1900. Serial No. 2,519. (No model.)

*To all whom it may concern:*

Be it known that I, GEORGE E. COMBS, a citizen of the United States, residing at Chadwicks, in the county of Oneida and State of New York, have invented certain new and useful Improvements in Feed-Troughs for Horses and other Animals; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to feed-troughs for horses and other animals; and it consists in certain improvements in the construction of such devices, as hereinafter described and claimed, the object of the invention being to furnish a feed-trough so constructed that the discharge of feed into the trough may be increased or reduced, as desired, and the animal prevented from eating too rapidly, so that his food will be properly chewed, also to prevent the waste of feed, such being common with horses when eating.

In the accompanying drawings, Figure 1 is a perspective view of a feed-trough constructed according to my invention. Fig. 2 represents a vertical central section of the same. Fig. 3 is a plan view of the device inverted. Fig. 4 illustrates a circular disk having a stirrer and horizontal arms.

A designates the trough, which is mostly circular, the rear portion being made straight, so that it may be fastened, if desired, to any suitable support by means of screws passed through holes $a$.

B indicates the hopper, into which the feed is cast, said hopper being centrally located and mounted on a raised portion $b$ of the floor of the trough, as shown. At the base of the hopper B are two opposite side openings $c$, through which the feed is allowed to pass from the hopper into the trough. For regulating the discharge of feed through the side openings $c$ into the trough a circular disk $e$ is placed within and at the base of the hopper. The disk $e$ has a downward cylindrical projection $r$, extending through a hole in the bottom of the hopper, the bottom being formed by the raised portion $b$. A cross-bar $h$, having a nut $i$ formed therewith, extends across the chamber formed by the raised portion $b$ of the trough. Threaded rods $m$ extend downward from the casing of the hopper to said cross-bar, to which they are secured by nuts $n$. A thumb-screw $f$ is mounted in the nut $i$, carried by the cross-bar, said screw registering with the projection $r$ of the disk $e$, so that the elevation of the disk may be adjusted by means of said screw.

Extending across the upper face of the disk $e$ and rigidly fastened thereto is a vertical plate $o$, which serves as a stirrer to drive the feed through the side openings $c$ during operation, as hereinafter stated. Two arms $p$ extend horizontally in opposite directions from the disk $e$ through the openings $c$ into or over the trough, said arms being intended severally to contact with the animal's nose when feeding, such contact giving the plate or disk $e$ a rotative movement and actuating the stirrer $o$, a limited rotative movement being allowed by the openings $c$. Guards at the mouth of the hopper are formed by the crossing rods $s$.

As will be seen the disk $e$ may be raised or lowered by means of the screw $f$, so as to entirely close the discharge end of the hopper or to increase or diminish the discharge of feed through the side openings $c$. The disk $e$ being raised, the narrowing of the openings $c$ thereby produced lessens the discharge of feed into the trough and the horse cannot devour it so rapidly. If the discharge of feed is checked from any cause, the feeding horse, moving his nose along in the trough, pushes against one of the arms $p$, actuates the stirrer $o$, thus loosening the feed and driving it to the openings $c$.

I claim—

In a feed-trough having a raised portion $b$, the combination of a hopper mounted on said raised portion and provided with side openings at its base, a cross-bar, provided with a nut $i$ and extending across the chamber formed by said raised portion, threaded rods which extend down from the casing of said hopper and are secured to said cross-bar, a circular disk placed in said hopper and having a vertical plate forming a stirrer, secured to its upper face, and a downward projection extending through a hole in the bottom of the hopper, horizontal arms extending from said disk through said side openings, and a vertical screw mounted in the nut carried by said cross-bar, substantially as and for the purposes described.

In testimony whereof I have affixed my signature in presence of two witnesses.

GEORGE E. COMBS.

Witnesses:
E. H. LLOYD,
R. C. HURD.